US012788093B1

(12) United States Patent
Weller

(10) Patent No.: US 12,788,093 B1
(45) Date of Patent: Nov. 10, 2026

(54) BEACON ASSEMBLIES AND SYSTEMS FOR USE WITH HARD HATS AND HARD HATS INCLUDING SAME

(71) Applicant: Missouri Highways and Transportation Commission, Jefferson City, MO (US)

(72) Inventor: Steven Weller, Camdenton, MO (US)

(73) Assignee: Missouri Highways and Transportation Commission, Jefferson City, MO (US)

( * ) Notice: Subject to any disclaimer, the term of this patent is extended or adjusted under 35 U.S.C. 154(b) by 0 days.

(21) Appl. No.: 19/246,013

(22) Filed: Jun. 23, 2025

(51) Int. Cl.
*A42B 3/04* (2006.01)
*H01Q 1/27* (2006.01)
*H04B 1/40* (2015.01)

(52) U.S. Cl.
CPC ............ *A42B 3/0453* (2013.01); *A42B 3/044* (2013.01); *H01Q 1/276* (2013.01); *H04B 1/40* (2013.01)

(58) Field of Classification Search
CPC ...... A42B 3/0453; A42B 3/044; H01Q 1/276; H04B 1/40
See application file for complete search history.

(56) References Cited

U.S. PATENT DOCUMENTS

| | | | | |
|---|---|---|---|---|
| 10,856,599 | B1 * | 12/2020 | Cuenca | A42B 1/245 |
| 10,995,936 | B1 * | 5/2021 | Breedlove | H05B 47/16 |
| 2011/0121654 | A1 * | 5/2011 | Recker | H02J 9/065 307/64 |
| 2012/0026726 | A1 * | 2/2012 | Recker | H05B 47/13 362/157 |
| 2013/0192961 | A1 * | 8/2013 | Waters | H01H 13/02 220/379 |
| 2016/0203663 | A1 * | 7/2016 | Proctor | G06F 3/16 340/5.61 |
| 2019/0350292 | A1 * | 11/2019 | Maldonado | H05B 45/20 |
| 2020/0215961 | A1 * | 7/2020 | Alataas | F21V 33/0004 |

* cited by examiner

*Primary Examiner* — Bryon T Gyllstrom
(74) *Attorney, Agent, or Firm* — Armstrong Teasdale LLP

(57) ABSTRACT

A beacon assembly for use with a hard hat includes a housing connected to the hard hat, a communication unit including a receiver for receiving an input signal, and a visual indicator moveable relative to the housing between a stowed position and a deployed position. In the stowed position at least a portion of the visual indicator is positioned within the housing and in the deployed position at least a portion of the visual indicator is positioned outside of the housing.

23 Claims, 7 Drawing Sheets

BEACON ASSEMBLIES AND SYSTEMS FOR USE WITH HARD HATS AND HARD HATS INCLUDING SAME

FIELD

The field of the disclosure relates generally to beacon assemblies and systems and, more particularly, to beacon assemblies and systems for use with hard hats.

BACKGROUND

Noisy environments, such as at a construction site, make it difficult to communicate between co-workers, increasing safety risks as workers cannot be easily alerted to dangerous conditions. Some known hard hats include a communication unit formed integrally with the hard hat. These hard hats may have an increased weight causing discomfort to a worker wearing the hard hat, particularly if the hard hat is worn for extended periods of time. At least some known hard hat systems merely emit a warning noise, which may be inaudible in such environments, rendering the system ineffective. Furthermore, these known systems have high implementation costs that require existing hard hats to be retired resulting in excessive waste. Accordingly, a need exists for effective and reliable communication between co-workers in noisy work environments that overcome the aforementioned drawbacks.

This section is intended to introduce the reader to various aspects of art that may be related to various aspects of the disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

SUMMARY

In one aspect, a beacon assembly for use with a hard hat includes a housing connected to the hard hat, a communication unit including a receiver for receiving an input signal, and a visual indicator moveable relative to the housing between a stowed position and a deployed position. In the stowed position at least a portion of the visual indicator is positioned within the housing and in the deployed position at least a portion of the visual indicator is positioned outside of the housing. The beacon assembly includes a controller communicatively connected to the communication unit and the visual indicator. The controller transmits a control signal to the visual indicator causing the visual indicator to be moved to the deployed position, responsive to an input signal received by the communication unit.

In another aspect, a beacon system includes a hard hat including a brim and a beacon assembly. The beacon assembly includes a housing connected to the hard hat, a communication unit including a receiver for receiving an input signal, a visual indicator moveable relative to the housing between a stowed position and a deployed position, and a controller communicatively connected to the communication unit and the visual indicator. The controller transmits a control signal to the visual indicator causing the visual indicator to be moved to the deployed position, responsive to an input signal received by the communication unit.

In yet another aspect, a method of operating a beacon assembly connected to a hard hat includes receiving, at a receiver, an input signal. The method includes responsive to receiving the input signal transmitting a control signal from a controller to a visual indicator causing at least one of a visual indicator to emit a light or deploy the visual indicator from a stowed position to a deployed position. In the stowed position at least a portion of the visual indicator is positioned within a housing and in the deployed position at least a portion of the visual indicator is positioned outside of the housing.

Various refinements exist of the features noted in relation to the above-mentioned aspects of the present disclosure. Further features may also be incorporated in the above-mentioned aspects of the present disclosure as well. These refinements and additional features may exist individually or in any combination. For instance, various features discussed below in relation to any of the illustrated embodiments of the present disclosure may be incorporated into any of the above-described aspects of the present disclosure, alone or in any combination.

BRIEF DESCRIPTION OF THE DRAWINGS

Corresponding reference characters indicate corresponding parts throughout the drawings.

DETAILED DESCRIPTION

Figure 1:
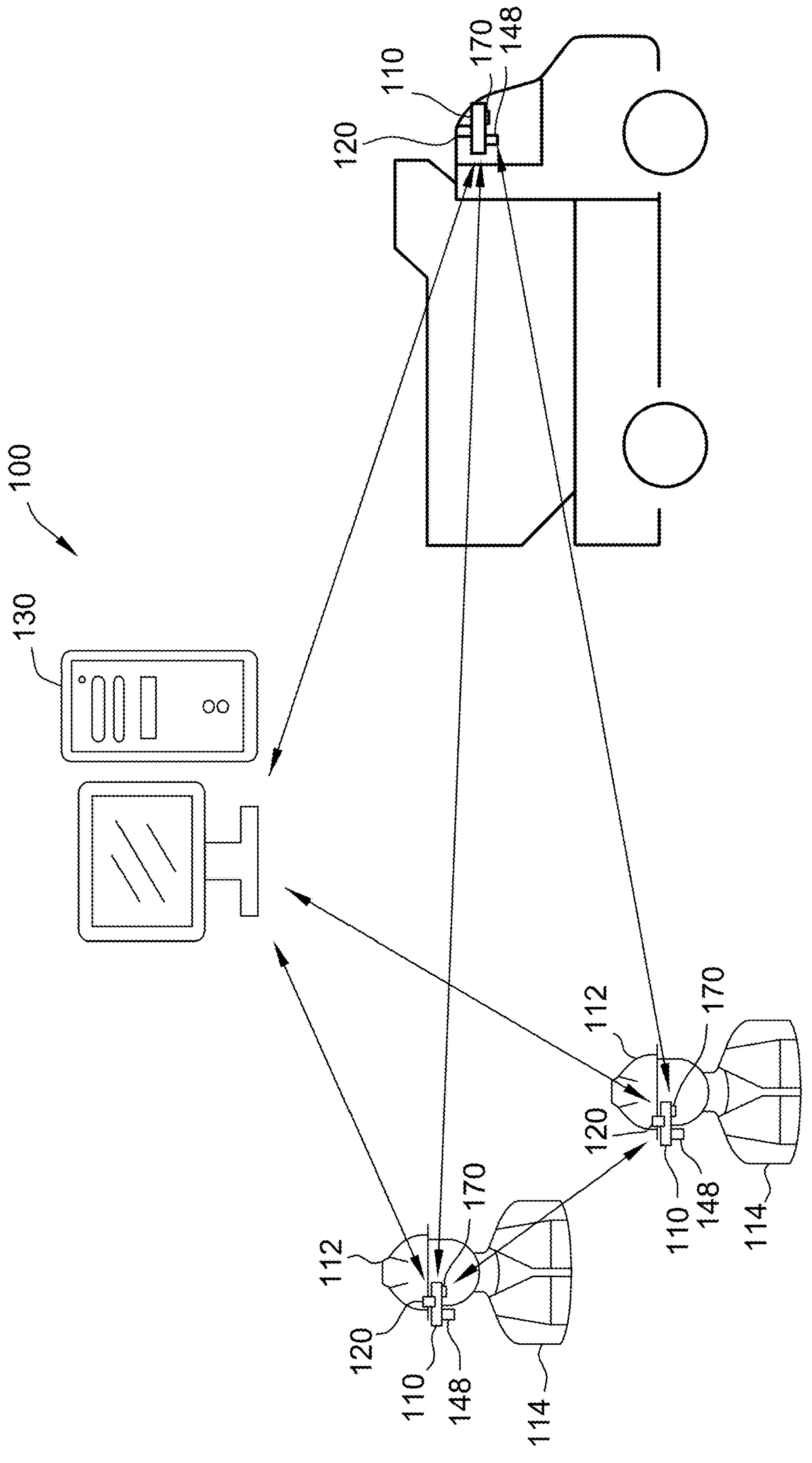
FIG. 1 is a schematic of a beacon system including one or more beacon assemblies.

FIG. 1 is a perspective view of a beacon system 100 including one or more beacon assemblies 110 for use with hard hats 112 for communication with a user 114, e.g., a user 114 wearing the hard hat 112. The beacon system 100 enables communications, e.g., warnings or messages, with beacon assemblies 110 associated with a user 114 or a plurality of users 114, such as construction workers at a worksite.

Figure 2:
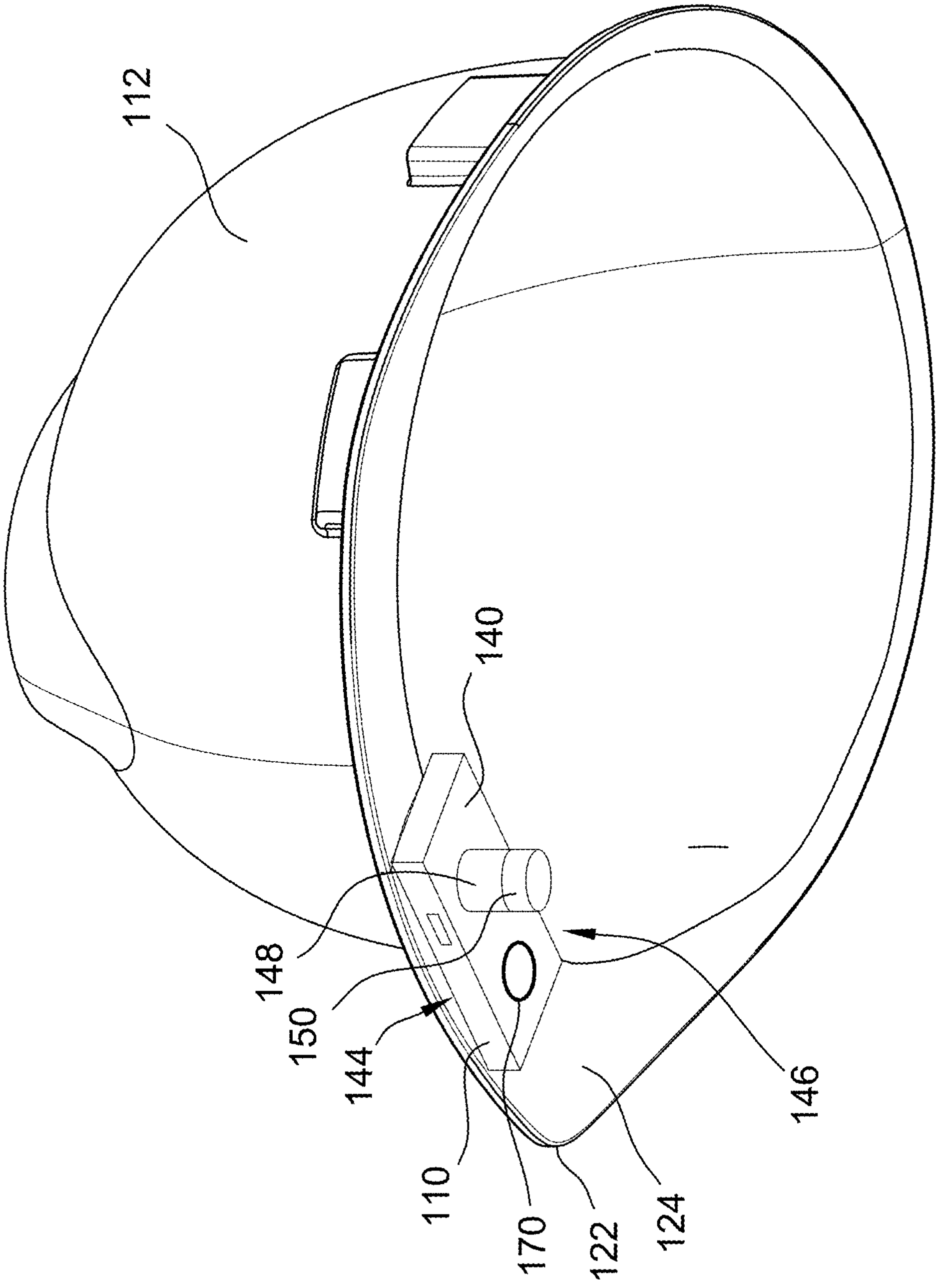
FIG. 2 is a perspective view of the beacon assembly shown in FIG. 1, attached to a hard hat.

As described in detail below, the beacon assembly 110 includes an attachment mechanism 120 enabling the beacon assembly 110 to be selectively connected or disconnected from a hard hat 112, e.g., a lower surface 124 of a brim 122 of the hard hat 112. FIG. 2. As such, in some embodiments, the beacon system 100 and beacon assemblies 110 are readily integrated with pre-existing hard hats 112 reducing waste because pre-existing hard hats 112 will not need to be replaced, resulting in lower implementation costs to incorporate the beacon system 100 and beacon assemblies 110 into a workplace or construction environment. In alternative embodiments, the beacon assembly 110 is formed integrally with a hard hat 112. Furthermore, embodiments of the beacon assembly 110 are lightweight, e.g., less than 10 ounces, such that the beacon assembly 110 attached to a hard hat 112 does not cause any additional discomfort during use. In some embodiments, the beacon assembly 110 is approximately 7 ounces, e.g., between 6.5 to 7.5 ounces.

In some embodiments, the beacon system 100 includes a computing device 130 that is communicatively connected to one or more beacon assemblies 110, e.g., associated with, or connected to, hard hats 112 worn by one or more construction workers within a worksite. Additionally, or alternatively, the beacon system 100 enables intercommunications between beacon assemblies 110, via a communication unit 312, described below with reference to FIG. 5.

Figure 3:
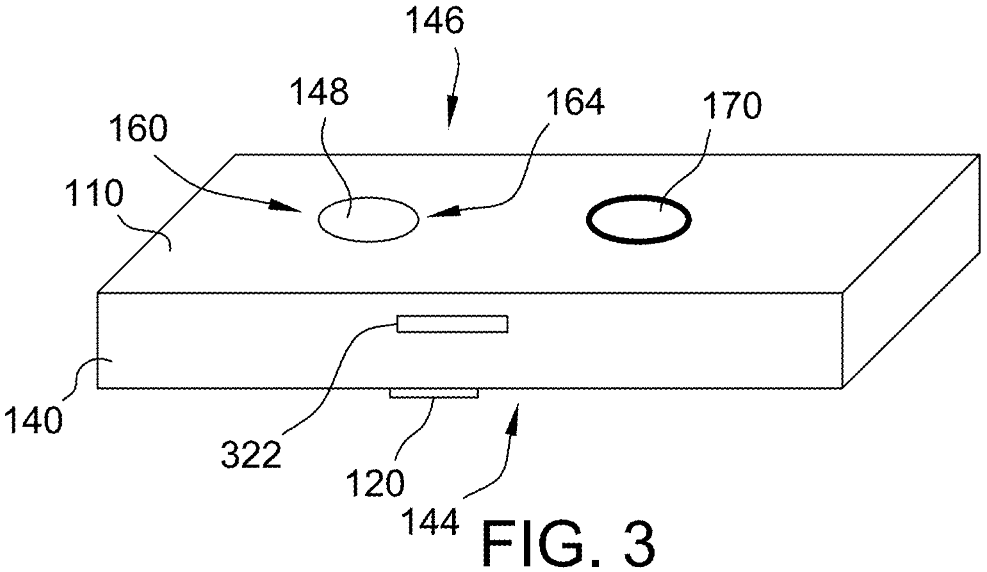
FIG. 3. is another perspective view of the beacon assembly shown in FIG. 1 including an visual indicator in a stowed position.
Figure 4:
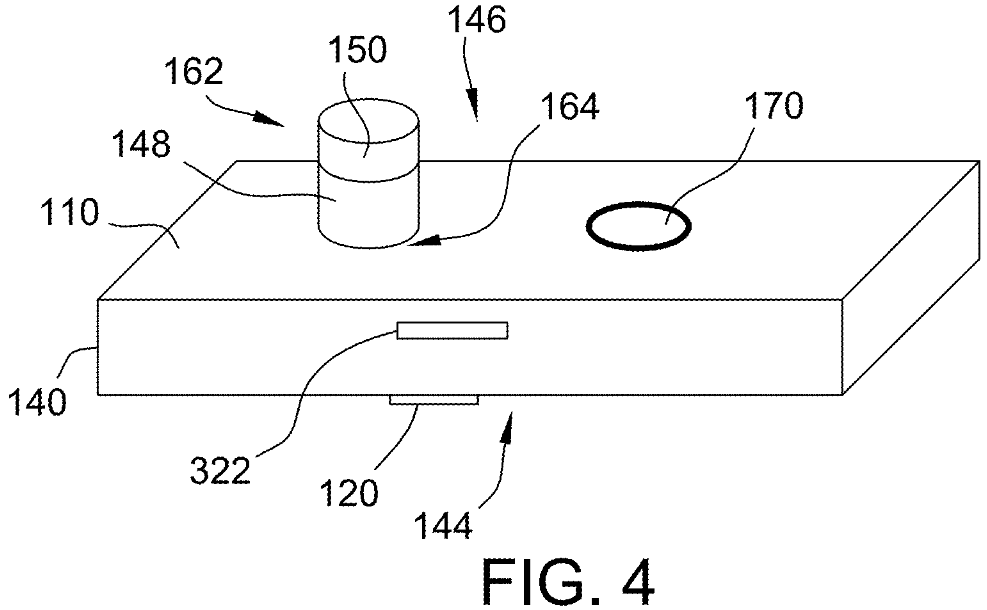
FIG. 4 is a lower perspective view of the beacon assembly shown in FIG. 3 including the visual indicator in a deployed position.

Referring to FIGS. 2-4, the beacon assembly 110 includes a housing 140 defining a cavity, not shown, for storing one or more components of the beacon assembly 110. The beacon assembly 110 includes a first side 144 including the attachment mechanism 120 for connecting the beacon assembly 110 to the brim 122 of the hard hat 112 and a second, opposing, side 146 that faces generally downward, e.g., towards a ground, when a user 114 is wearing a hard hat 112 connected to the beacon assembly 110. The beacon assembly 110 includes an indicator unit 148 positioned on the second side 146.

In the illustrated embodiments, the indicator unit 148 includes a visual indicator 150, e.g., a light, display, or screen, etc. In some embodiments, the visual indicator 150 is used to display a visual signal or notification, e.g., a warning light, pulsing, blinking, or flashing lights, colored lights to indicate a coded level of severity of a warning, and/or a message including text or symbols, etc. In the illustrated embodiment, the visual indicator 150 displays a signal that is viewed by the user 114 when the user 114 is wearing the hard hat 112. In some embodiments, the visual indicator is visible to both a user 114 wearing the hard hat 112 as well as a person nearby, simultaneously. For example, in some embodiments, the visual indicator 150 displays a signal in both a forward direction outwards from the hard hat 112 (e.g., anteriorly to the user 114 wearing the hard hat 112) and a rearward direction towards the user's face and/or line of sight (e.g., posteriorly to the user 114 wearing the hard hat 112). In some embodiments, the visual indicator 150 displays the signal in all directions, e.g., 360°.

In some embodiments, the indicator unit 148 also includes a speaker, not shown, for emitting an audible warning signal. In some embodiments, the visual indicator 150 and the speaker are operated simultaneously to warn a user 114 wearing the hard hat 112 with both a visual and an audible warning signal. In some embodiments, the speaker emits a clicking or ticking noise, e.g., synched with a pulsing light emitted by the visual indicator 150.

Figure 5:
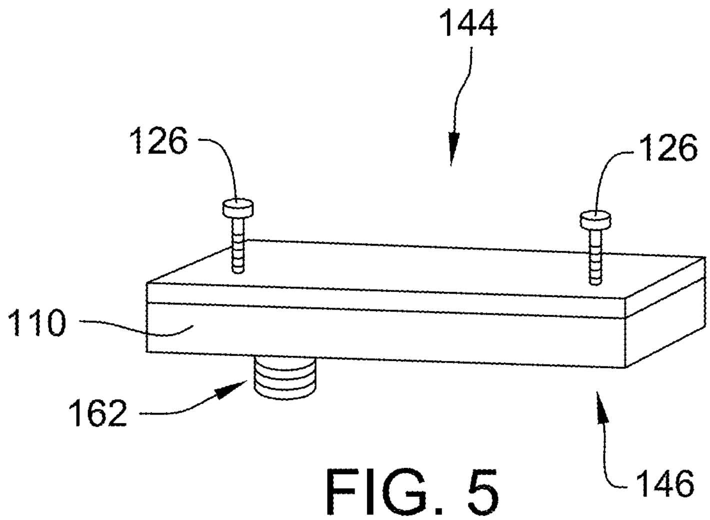
FIG. 5 is a perspective view of another embodiment of a beacon assembly.

In some embodiments, the indicator unit 148 includes an actuator 152, FIG. 5, that moves the visual indicator 150 between a stowed position 160, FIG. 3 and a deployed position 162. FIG. 4. In some embodiments, in the stowed position 160, at least a portion of the visual indicator 150 is positioned within the cavity and in the deployed position 162, the visual indicator 150 is moved, e.g., translated, through an opening 164 formed through the housing 140, such that at least a portion of the visual indicator 150 is positioned outside of the housing 140. In some embodiments, the visual indicator 150 may be translated along a vertical axis, e.g., perpendicular to a ground.

In some embodiments, the deployment (e.g., the movement or translation) of the visual indicator 150 from the stowed position 160 to the deployed position 162 also serves as a visual signal to a user 114 wearing a hard hat 112 connected to the beacon assembly 110. In some embodiments, deployment of the visual indicator 150 displaces the visual indicator 150 generally along a superior-inferior axis (e.g., perpendicular to a ground surface and/or parallel to an anatomical superior-inferior axis of a user 114 wearing a hard hat 112 connected to the beacon assembly 110). Deployment of the visual indicator 150 moves the visual indicator 150 into a line of sight (e.g., peripheral vision line of sight) of the user 114 wearing the hard hat 112. The small dimension of the visual indicator 150, combined with the deployed position 162 of the visual indicator 150 is such that the visual indicator 150 is visible but does not obstruct the vision of the user 114.

In some embodiments, the beacon assembly 110 includes one or more user inputs 170, e.g., buttons, switches, knobs, that may be selected, enabling a user 114 to initiate transmission of a signal, e.g., via the communication unit 312, to another beacon assembly 110 and/or the computing device 130.

In some embodiments, the attachment mechanism 120 includes a clip including a hinge and a biasing mechanism enabling the clip to be selectively connected or disconnected to the brim 122 of the hard hat 112. In some alternative embodiments, the attachment mechanism includes a clamp including a threaded screw that is used to selectively connect or disconnect the attachment mechanism 120 to the hard hat 112. The attachment mechanism 120 is enabled to connect or disconnect the beacon assembly 110 to other structures. For example, the attachment mechanism 120 is used to connect or disconnect the beacon assembly 110 to a visor of a vehicle. For example, in some cases a user 114 removes their hard hat 112 when driving or operating construction equipment, and the attachment mechanism 120 is used to connect or mount the beacon assembly 110 to a surface of the vehicle or equipment, e.g., in the line of sight of the user 114. The attachment mechanism 120 improves the versatility of the beacon system 100 and assemblies 110 by enabling the beacon assembly 110 to be connected or disconnected to various structures as needed or desired by the user 114. In some embodiments, e.g., the embodiment shown in FIG. 5, the attachment mechanism 120 includes one or more screws 126, e.g., a pair of nylon screws, that are threadly engaged to the hard hat 112, or retained using a nut (not shown).

Figure 6A:
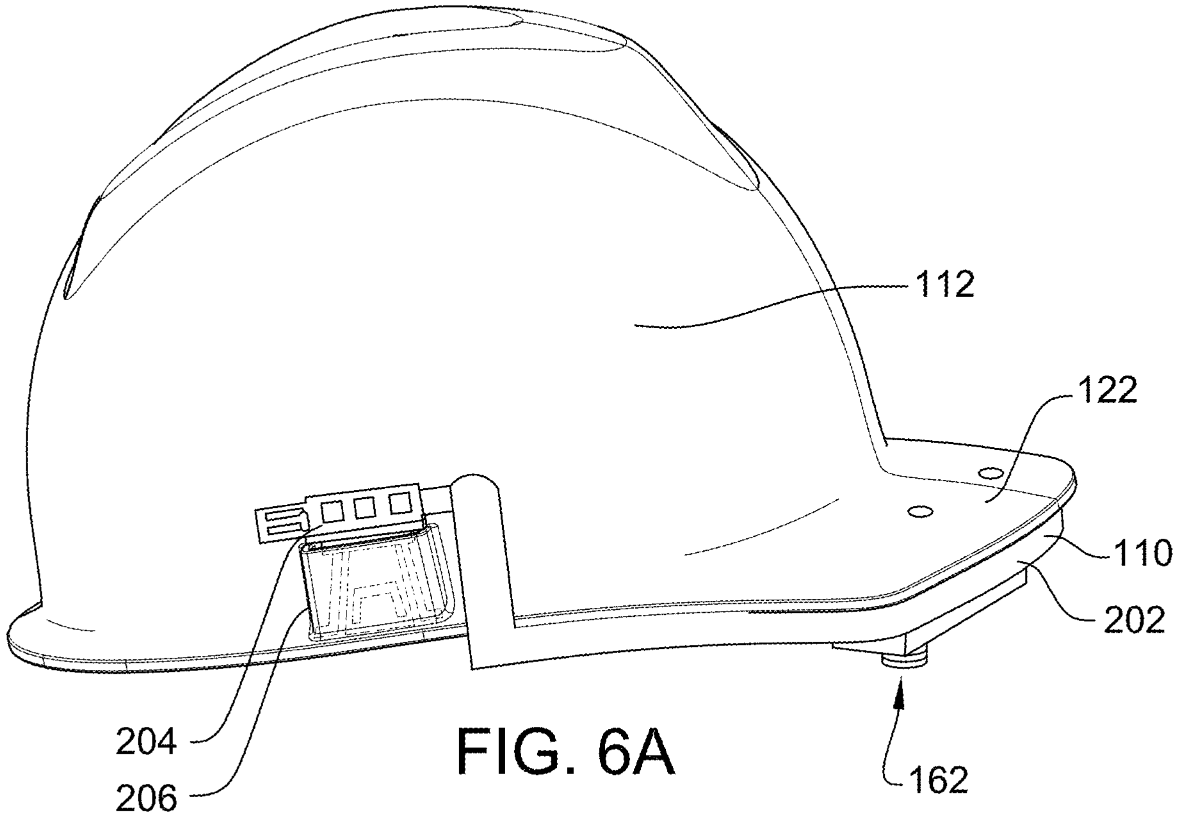
FIG. 6A is an upper perspective view of another embodiment of a beacon assembly attached to a hard hat.
Figure 6B:
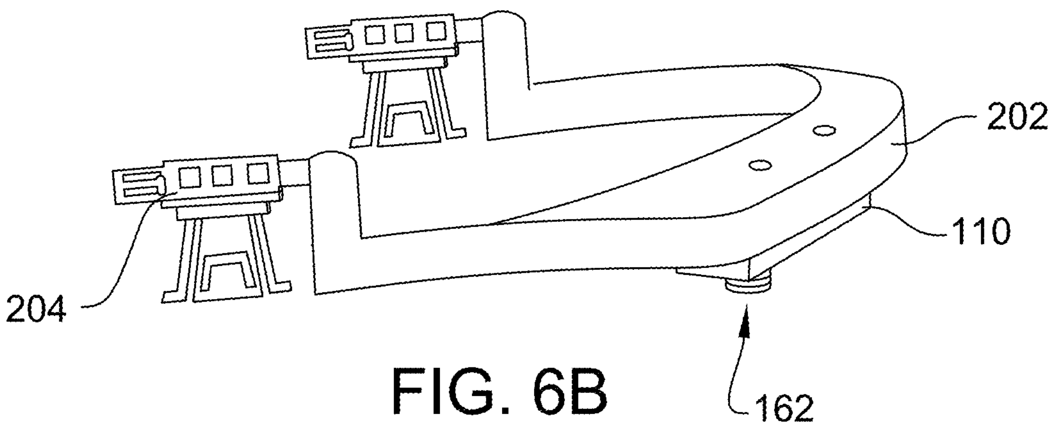
FIG. 6B is an upper perspective view of the beacon assembly shown in FIG. 6A.

In reference to FIGS. 6A and 6B, in some embodiments, the beacon assembly 110 is connected to a brim 202, e.g., a detachable brim, that is selectively connected to a pre-existing hard hat 112 and/or the brim 122 of a pre-existing hard hat 112, using one or more clips 204. In some embodiments, the clips 204 are selectively engaged with a surface feature of the hard hat 112, and/or in some cases the hard hat 112 includes one or more slots 206 such that a portion of the clip 204 is disposed within the slot 206 when the beacon assembly 110 is connected to the hard hat 112. In some embodiments, the beacon assembly 110 includes both the clips 204 and the screws 126. In alternative embodiments, the beacon assembly 110 includes any suitable attachment mechanism or features that enable the beacon assembly 110 to be selectively connected or disconnected to the hard hat 112.

Figure 7:
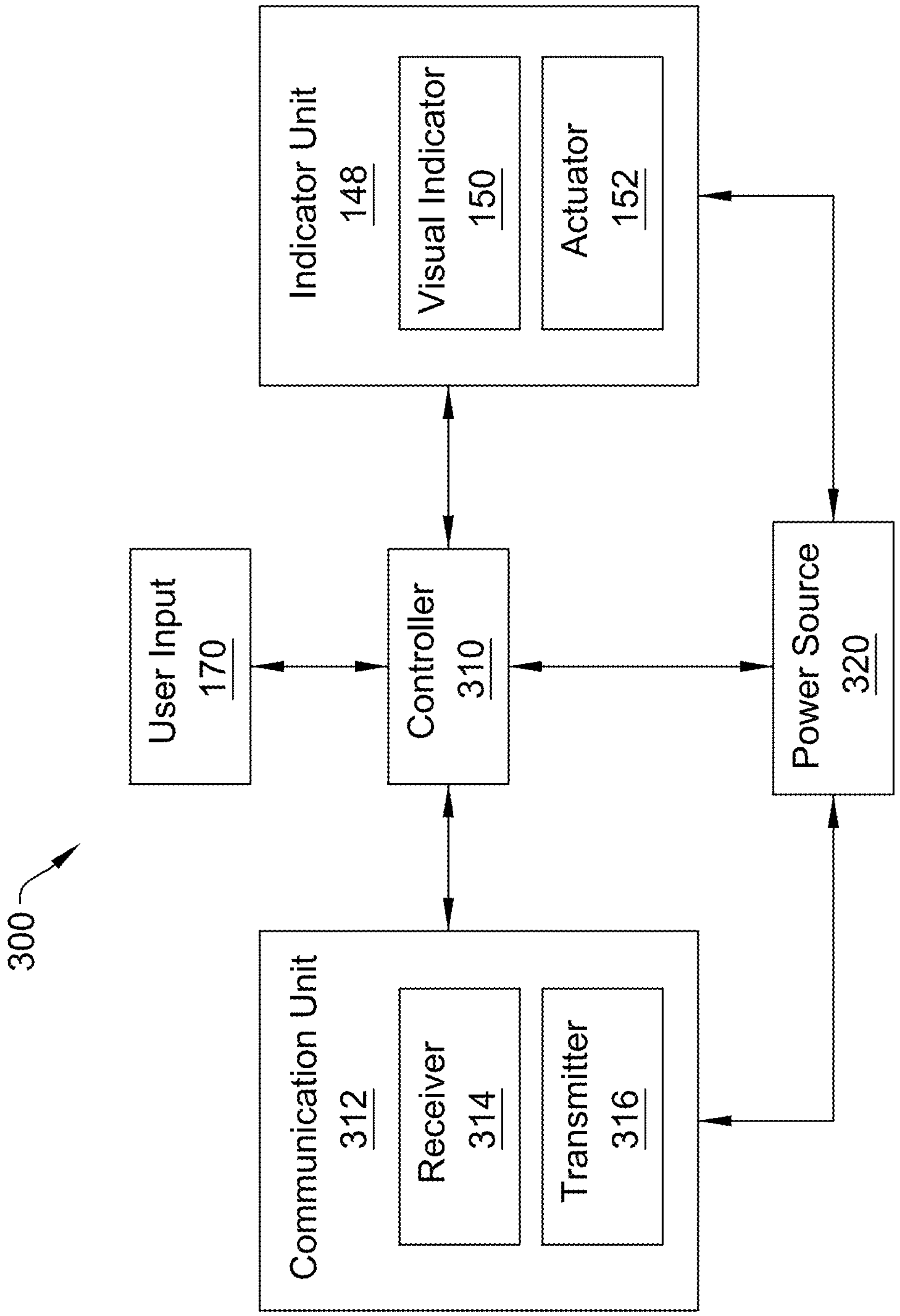
FIG. 7 is a schematic diagram of a control system including a controller and a communication unit for use with the beacon assembly shown in FIG. 1.

In reference to FIG. 7, the beacon assembly 110 includes a control system 300 including a controller 310 and the communication unit 312 that is communicatively connected to the controller 310. In some embodiments, the communication unit 312 includes a receiver 314 for receiving one or more signals from one or more sources, e.g., a communication unit 312 of another beacon assembly 110 or the computing device 130. In some embodiments, the communication unit 312 also includes a transmitter 316 for transmitting signals to other beacon assemblies 110 and/or to the computing device 130. In some embodiments, the communication unit 312 utilizes radio frequency for communication transmissions. For example, the transmitter and the receiver are a radio frequency transmitter and receiver.

In some embodiments, the controller 310 transmits one or more control signals to the indicator unit 148, e.g., based on input signals received by the receiver 314. For example, the controller 310 transmits one or more signals to the actuator 152 causing the actuator 152 to move the visual indicator 150 between the stowed position 160 and the deployed position 162, e.g., responsive to the receiver 314 receiving an input signal. In some embodiments, the controller transmits one or more control signals to the actuator 152 causing the visual indicator 150 to move from the deployed position 162 to the stowed position 160. For example, in some embodiments, the controller 310 moves the deployed visual indicator 150 to the stowed position 160 after a threshold period of time after the visual indicator 150 was initially deployed. Additionally, or alternatively, the visual indicator 150 is manually moved from the deployed position 162 to the stowed position 160, e.g., the user 114 wearing the hard hat 112 presses upwards on the visual indicator 150 moving the visual indicator 150 back into the stowed position 160. In some embodiments, manual movement of the visual indicator 150 into the stowed position 160 initiates transmission of a signal, e.g., via a position sensor, to the controller 310, indicating to the controller 310 that a signal or notification has been received (e.g., viewed or heard) by the user 114. In some embodiments, responsive to the visual indicator 150 being moved into the stowed position 160, the controller 310 causes the transmitter 316 to transmit a message or output signal. Stated another way, movement of the visual indicator 150 serves as an acknowledgement that a signal was received by a user 114.

In some embodiments, the user input 170 is communicatively connected to the controller 310 and/or the communication unit 312. In some embodiments, a user 114 selects the user input 170, e.g., push a button or flip a switch, causing the user input 170 to transmit a signal to the controller 310 or the communication unit 312 to cause the transmitter 316 to transmit a signal to another beacon assembly 110 and/or to the computing device 130.

The beacon assembly 110 includes a power supply 320 (e.g., a battery), contained within the cavity of the housing 140, for supplying power to various components of the beacon assembly 110, e.g., to the receiver 314, the transmitter 316, the controller 310, and/or the actuator 152. In some embodiments, the beacon assembly 110 includes a charging port 322 that is electrically connected to the power supply 320 for selectively charging the power supply 320. The attachment mechanism 120 further enables the beacon assembly 110 to be removed from the hard hat 112 for charging, e.g., so that a user 114 continues to have access to their hard hat 112 while the beacon assembly 110 is charging. The capacity of the power supply 320 and/or the run time of the beacon assembly 110 is such that charging is not necessarily required to be performed during a working shift of a user 114. For example, in some embodiments, the power supply 320 has sufficient capacity to enable the beacon assembly 110 to have a run time of 24 hours, 36 hours, and/or 48 hours, before needing to be recharged.

Figure 8:
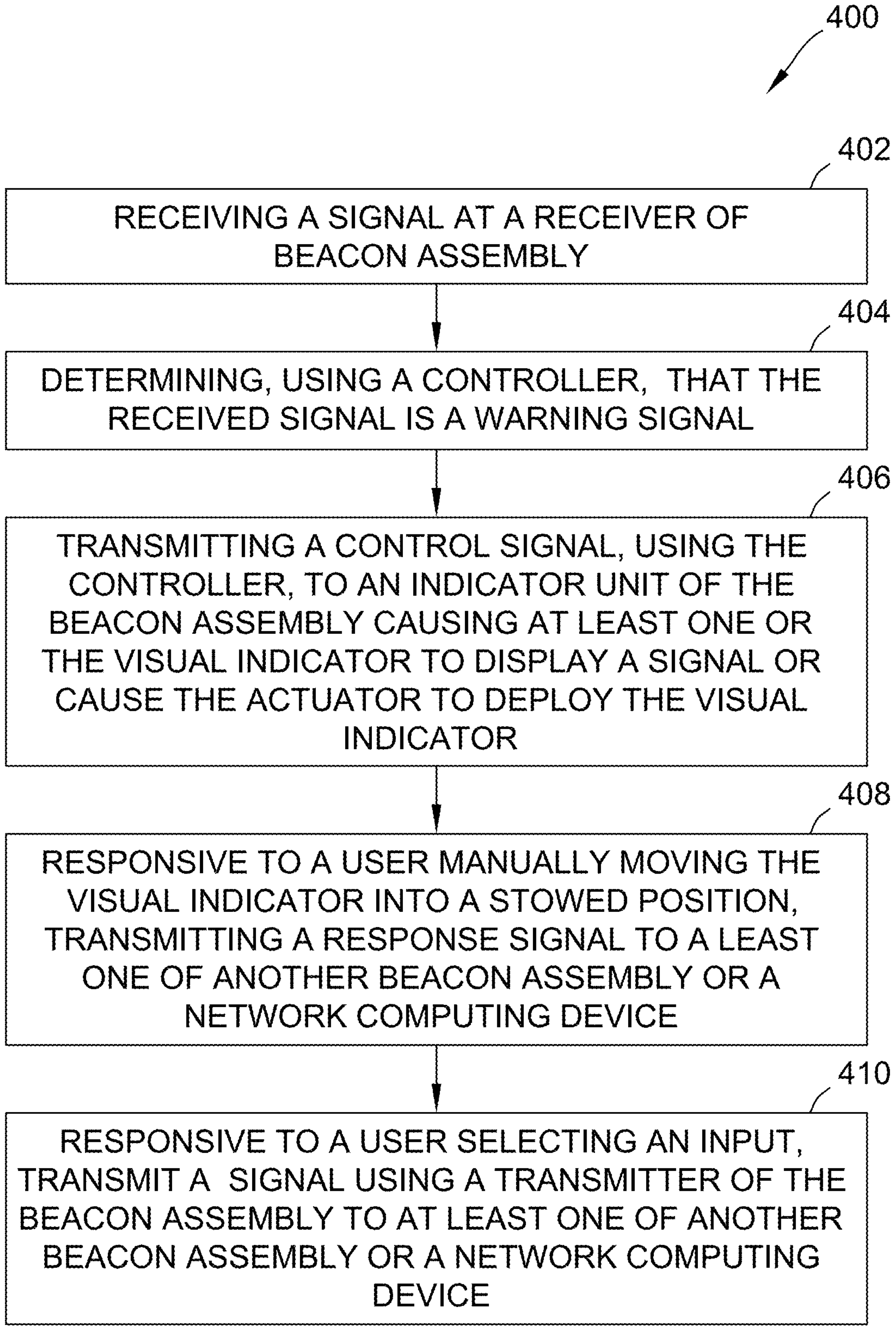
FIG. 8 is a process flow diagram of a method of using the beacon system including a beacon assembly.

In reference to FIG. 8, a method 400 for use with the beacon system 100 including one or more beacon assemblies 110, as shown in FIG. 1, is provided. The method 400 includes receiving 402 a signal at the receiver 314 of the beacon assembly 110. Determining 404, using the controller 310, that the received signal is a warning signal. The method 400 includes transmitting 406 a control signal, from the controller 310 to the indicator unit 148 of the beacon assembly 110. In some embodiments, the control signal causes at least one of the visual indicator 150 to emit a light and/or cause the actuator 152 to deploy the visual indicator 150 from the stowed position 160 to the deployed position 162. In some embodiments, the method 400 includes the controller 310 transmitting a plurality of control signals to the indicator unit 148. For example, after receiving an input signal, at the receiver 314, the controller 310 transmits a first signal to the actuator 152 causing the actuator 152 to deploy the visual indicator 150 and a second signal to the visual indicator 150 causing the visual indicator 150 to emit a light. In some embodiments, the first and second signals are transmitted simultaneously such that the visual indicator 150 emits a light while being deployed. In some embodiments, the controller 310 transmits one or more additional control signals to cause the visual indicator 150 to change a parameter of the light, e.g., change pulse frequency, change color, etc. In some embodiments, the method 400 includes the controller 310 transmitting a control signal to the speaker, responsive to the receiver 314 receiving an input signal, causing the speaker to emit an audible noise.

In some embodiments, the method 400 includes, responsive to a user 114 manually moving the visual indicator 150 into the stowed position 160, transmitting 408 a response signal, via the transmitter 316, to at least one of another beacon assembly 110 or the computing device 130. For example, in some embodiments, the response signal causes to be displayed on the computing device 130 a message, e.g., a confirmation message or signal indicating that the user 114 has acknowledged receiving the input signal.

Responsive to a user 114 selecting the user input 170, the method 400 includes transmitting 410 a signal using a transmitter 316 of the beacon assembly 110 to at least one of another beacon assembly 110 or the computing device 130.

Embodiments of the beacon system and beacon assemblies described above enable visual signals of a visual indicator to be presented to a user, when the beacon assembly is connected to a hard hat, while the user is wearing the hard hat. As such, a worker is warned within a construction site expeditiously without relying on an auditory signal which may be obscured by ambient noise. Embodiments of an indicator unit include an actuator which moves the visual indicator from a stowed position to a deployed position to arrange the visual indicator in a line of sight of the user wearing the hard hat. Embodiments of the beacon assembly 110 enable the worker to selectively move the visual indicator between the deployed position and the stowed position indicating to the controller, or other beacon assemblies or the computing device, that the worker has viewed the warning signal, serving as an acknowledgment that the worker is aware of the warning.

As used herein, the terms “about,” “substantially,” “essentially” and “approximately” when used in conjunction with ranges of dimensions, concentrations, temperatures or other physical or chemical properties or characteristics is meant to cover variations that may exist in the upper and/or lower limits of the ranges of the properties or characteristics, including, for example, variations resulting from rounding, measurement methodology or other statistical variation.

When introducing elements of the present disclosure or the embodiment(s) thereof, the articles “a”, “an”, “the” and “said” are intended to mean that there are one or more of the elements. The terms “comprising,” “including,” “containing” and “having” are intended to be inclusive and mean that there may be additional elements other than the listed elements. The use of terms indicating a particular orientation (e.g., “top”, “bottom”, “side”, etc.) is for convenience of description and does not require any particular orientation of the item described.

As various changes could be made in the above constructions and methods without departing from the scope of the disclosure, it is intended that all matter contained in the above description and shown in the accompanying drawing[s] shall be interpreted as illustrative and not in a limiting sense.

What is claimed is:

1. A beacon assembly for use with a hard hat, wherein the beacon assembly comprises:

a housing connected to the hard hat;

a communication unit including a receiver for receiving an input signal;

a visual indicator moveable relative to the housing between a stowed position and a deployed position, wherein in the stowed position at least a portion of the visual indicator is positioned within the housing in a position that would not be visible to a user wearing the hat and in the deployed position at least a portion of the visual indicator is positioned outside of the housing such that the visual indicator would be visible to a user wearing the hard hat; and a controller communicatively connected to the communication unit and the visual indicator, wherein the controller transmits a control signal to the visual indicator causing the visual indicator to be moved to the deployed position, responsive to an input signal received by the communication unit.

2. The beacon assembly of claim 1, wherein the visual indicator includes a light configured to emit light in a rearward direction toward a user wearing the hard hat.

3. The beacon assembly of claim 1 comprising an attachment mechanism for selectively connecting the beacon assembly to a lower surface of a brim of the hard hat.

4. The beacon assembly of claim 1, wherein the communication unit includes a transmitter for transmitting an output signal.

5. The beacon assembly of claim 4, wherein the transmitter and the receiver are a radio frequency transmitter and receiver.

6. The beacon assembly of claim 1 comprising a user input communicatively connected to the communication unit, wherein selection of the user input causes the communication unit to transmit an output signal.

7. The beacon assembly of claim 1, wherein the visual indicator is manually moved from the deployed position to the stowed position.

8. The beacon assembly of claim 1, wherein responsive to the visual indicator moved from the deployed position to the stowed position, the controller causes the communication unit to transmit a confirmation signal.

9. The beacon assembly of claim 1 further comprising a speaker communicatively connected to the controller, wherein the controller causes the speaker to emit a noise responsive to an input signal received by the communication unit.

10. The beacon assembly of claim 1 further comprising an actuator for translating the visual indicator between the stowed position and the deployed position.

11. The beacon assembly of claim 1, wherein the beacon assembly weights less than 10 ounces.

12. The beacon assembly of claim 1, wherein the visual indicator is moveable relative to the housing between the stowed position and the deployed position along a superior inferior axis generally perpendicular to a ground surface.

13. The beacon assembly of claim 1, wherein movement of the visual indicator between the deployed position and the stowed position causes the transmitter to transmit an output signal.

14. The beacon assembly of claim 1, wherein the visual indicator includes a light configured to selectively emit light in at least one of a rearward direction toward a user wearing the hard hat and an opposing forward direction.

15. A beacon system comprising:

a hard hat including a brim;

a beacon assembly comprising:

a housing connected to the hard hat;

a communication unit including a receiver for receiving an input signal;

a visual indicator moveable relative to the housing between a stowed position and a deployed position, wherein in the stowed position the visual indicator is not visible to the user wearing the hard hat and in the deployed position the visual indicator would be visible to a user wearing the hard hat; and a controller communicatively connected to the communication unit and the visual indicator, wherein the controller transmits a control signal to the visual indicator causing the visual indicator to be moved to the deployed position, responsive to an input signal received by the communication unit.

16. The beacon system of claim 15, wherein the visual indicator includes a light configured to emit light in a rearward direction toward a user wearing the hard hat.

17. The beacon system of claim 15 comprising an attachment mechanism for selectively connecting the beacon assembly to a lower surface of a brim of the hard hat.

18. The beacon system of claim 15, wherein the communication unit includes a transmitter for transmitting an output signal.

19. The beacon system of claim 18, wherein the transmitter and the receiver are a radio frequency transmitter and receiver.

20. The beacon system of claim 15 comprising a user input communicatively connected to the communication unit, wherein selection of the user input causes the communication unit to transmit an output signal.

21. A method of operating a beacon assembly connected to a hard hat, the method comprising: receiving, at a receiver, an input signal; and responsive to receiving the input signal, transmitting a control signal from a controller causing i) a visual indicator deploy from a stowed position to a deployed position, wherein in the stowed position at least a portion of the visual indicator is positioned within a housing and in the deployed position at least a portion of the visual indicator is positioned outside of the housing and ii) emit a visual signal in a rearward direction toward a user wearing the hard hat.

22. The method of claim 21, wherein the method further comprises:

responsive to the visual indicator being moved from the deployed position to the stowed position, transmitting an output signal from a transmitter to at least one of another beacon assembly or a computing device.

23. The method of claim 21, wherein the method further comprises:

responsive to a user input being selected, transmitting an output signal from a transmitter to at least one of another beacon assembly or a computing device.

* * * * *